Figure 1:
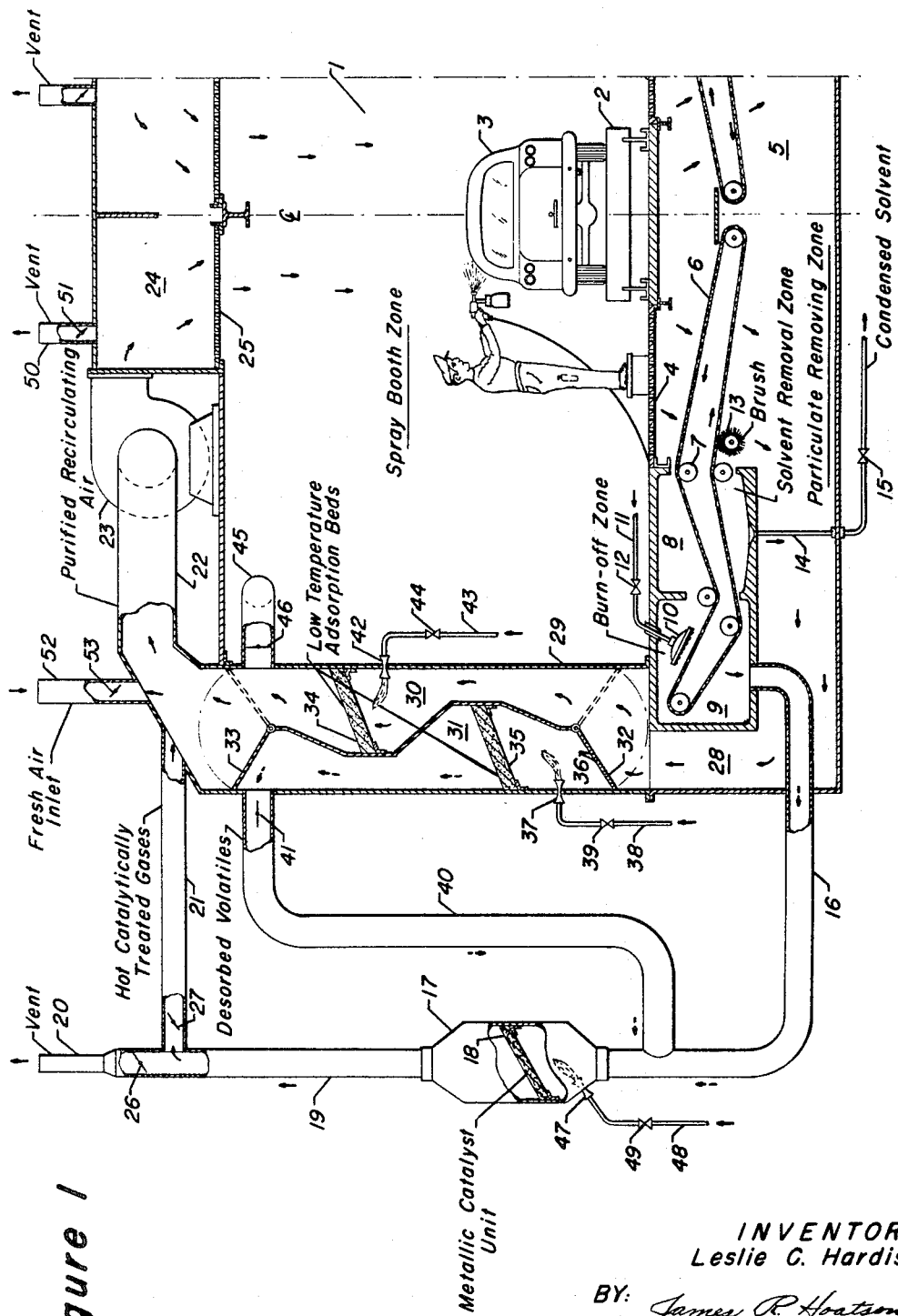

Aug. 6, 1968

L. C. HARDISON 3,395,972

METHOD OF CLEANING AND PURIFYING PARTICLE
LADEN DISCHARGE STREAMS

Filed May 20, 1965

2 Sheets-Sheet 1

INVENTOR:
Leslie C. Hardison

BY: James R. Hoatson Jr.
Philip T. Liggett

ATTORNEYS

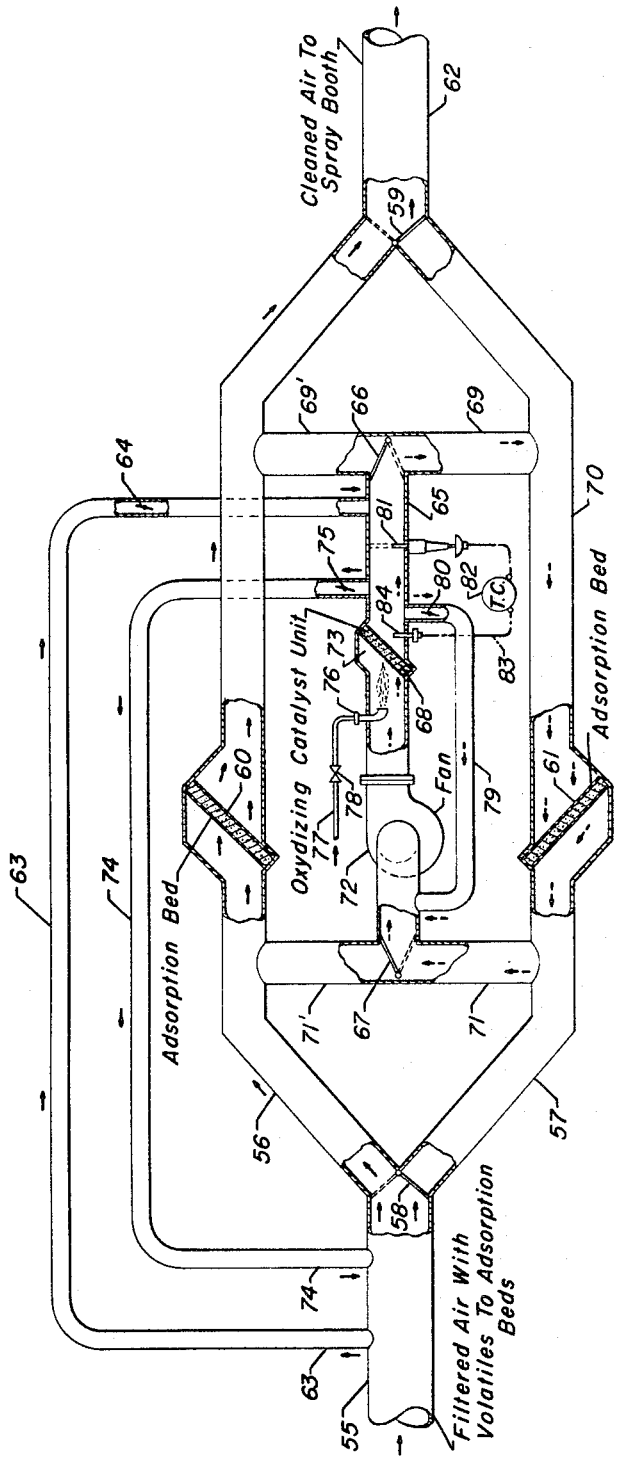

United States Patent Office 3,395,972
Patented Aug. 6, 1968

3,395,972
METHOD OF CLEANING AND PURIFYING PARTICLE LADEN DISCHARGE STREAMS
Leslie C. Hardison, Chippewa Falls, Wis., assignor to Universal Oil Products Company, Des Plaines, Ill., a corporation of Delaware
Filed May 20, 1965, Ser. No. 457,436
13 Claims. (Cl. 23—4)

This application relates to means for effecting the cleaning and purifying of a discharge air stream from a processing zone with entrained particulates and volatile components. More specifically there is provided a multistage cleaning system which includes the treating of the air stream so as to permit it to be returned to the processing zone, as for example a paint spray booth or restaurant kitchen, in a clean, warm and purified state.

Various systems have been utilized for handling and treating an air stream containing particulates and volatiles from a paint spray booth, or from operations providing an equivalent type of problem. For example, there has been used a method of water washing the exhaust stream from a spray booth to remove entrained paint particles. Such a system results in a disposal problem for the paint sludge and further causes saturation of the air stream so that it cannot satisfactorily be reused in the spray booth. For proper paint spraying and drying conditions, there is a need for a dry air environment within the spraying zone. Also, there is a particular cost advantage which can be obtained by eliminating the heat requirements for drying and preheating all of the air that is being introduced into the spray booth. The water wash system or any other system which precludes reuse of the air and necessarily results in the total discharge of the air stream from the system is thus costly and undesirable.

It may be considered a principal object of the present invention to provide a multi-stage system for treating a discharge air stream which contains particulates as well as volatiles that are obnoxious or combustible so as to permit recirculation of at least a major portion of the stream in a substantially particle free, purified state.

It is also an object of the present invention to provide a heat resistant continuous belt means for use in filtering out and burning up the particulates from the discharge stream so as to provide a convenient disposal method for such material, as well as provide in addition thereto both catalytic oxidation and or adsorbent bed means for effecting the removal of volatile and combustible components from, respectively, the vent stream and the recirculating air stream.

Briefly the present improved purifying system includes, at least one moving metal screen type of belt for collecting particulates, a burn-off zone for the continuous oxidation and removal of the deposited material on the belt and at least one fume elimination zone usable for the further incineration and purification of combustion gases from the burn-off zone, and or for use in treating the air stream to be returned to the processing zone which evolves the particulates and combustible materials.

One of the particular features of the multi-zone treating system is the use of one or more layers of wide metal alloy mesh or screening for the filtering belt. Such mesh may comprise various heat resistant chrome-nickel alloys or "stainless steels" that can be subjected to high temperature treatment in a burn-off zone over prolonged periods of time without excessive creep problems. The particular mesh size of the screening may of course vary with the various types of particulates which are to be filtered out of the air stream. For example, in the collection of particulates of pigment from an air stream carrying the entrained mist of car body enamels or lacquers, it may be desirable to utilize a fine mesh alloy screen of approximately the 50 to 80 mesh size, or a combination of screens, such as adjacent layers of 40 mesh and 70 mesh screens. The belt may be mounted in a continuous looped manner over suitably placed metal crown rollers such that the belt continuously moves from a filtering zone into a burn-off zone where the particulates are removed by high temperature emitting infra-red heaters or other burner means so as to provide for a cleaned portion of the belt to be continuously returned to the filtering zone.

It is, of course, a feature of the present system to utilize controlled heating means within the burning zone of the unit so as to provide adequate and complete removal of the paint or other deposited particles from the alloy screening without the generation of excessive combustion gases. One desirable form of burner means may comprise an infra-red heat generator utilizing the "flame-less" generation of heat from one or more fine alloy mesh screening surfaces, where there is controlled catalytic burning of a fuel-air mixture on the surface of the screen. Preferably, the infra-red burner means is operated to burn in a "rich" manner to in turn minimize the presence of oxygen in the combustion gases and thereby preclude the burning of paint or other particulates on the screen at any distance upstream from the burner zone. In other words, burning and paint removal will be confined primarily to that portion of the belt being impinged by the infra-red rays from the burner. The use of an endless belt-type of screen in a filtering zone and in a burner-zone as herein set forth shall, of course, not be limited to collecting only paint or grease particles for many types of compustible particulates, including various chaffs or lints, etc., may be readily removed from exhaust streams.

Where there are no obnoxious volatiles in the air stream from the processing zone, then in most cases such stream can be discharged or returned to the processing zone with no further treatment. However, in order to accommodate an air stream with relatively low quantities of combustible volatiles, as well as provide a means to adsorb such volatiles at a low temperature, it is a feature of the present system to utilize adsorption beds to effect the removal of the combustible and volatile components in the air stream which leaves the filtering zone. From the use of a suitable adsorber bed, there is a resulting substantially pure air stream which may be returned to the paint spray booth or other processing zone for reuse therein at substantially the same temperature at which it is discharged. A preferred operation may of course be carried out to vent a small portion of the recirculating air stream and to introduce a replacement of fresh air into such stream. The type of adsorption bed may vary in accordance with the nature of the volatile components within the air stream leaving the filtering zone. In connection with an air stream from a paint spray booth utilizing certain of the acrylic lacquers, it has been found that a bed of activated carbon particles operates quite satisfactorily to remove a high percentage of the volatiles and can continue to absorb such volatiles up to about 30 to 40 percent by weight of the carbon. Other suitable adsorption media may comprise: silica gel, alumina, charcoal, etc., or various of the alumino-silicate materials known as molecular sieves. Preferably, at least two different adsorption beds are utilized for accommodating the removal of the entrained volatile components from the air stream so that one bed of adsorbent material may be undergoing reactivation or desorption while the other bed is in use to treat the laden air stream.

Various schemes may be utilized for effecting the desorption of the component(s) from the adsorbing beds. For example, a heated air stream may be utilized to satisfactorily effect the removal of the adsorbed volatile components from the beds and the resulting desorption stream carried to a catalyst oxidation zone where there will be the substantially complete oxidation of the combustible components of the stream to carbon dioxide and water, prior to its being discharged into the atmosphere or admixed into the recirculating air stream. In a more refined scheme, there may be a closed desorption loop utilizing the continuous circulation of a hot air stream to effect the desorption of volatiles from the adsorption bed and the transfer of these volatiles to a catalytic oxidation zone. Also utilized is the means for introducing a slip-stream of oxidized gases into the main recirculating air stream going to the processing zone while at the same time effecting the intake of a make-up portion of the air stream containing volatiles whereby there is no need to effect a discharge of any of the treated desorption stream to the atmosphere. Suitable burner means may be utilized in the desorption system to effect preheating and heat control of the circulating stream; however, by the use of an active catalyst oxidizing unit in the desorption loop there will be heat of combustion, that is generated by the incineration of the volatiles and the need of very little external heat in the system.

The accompanying drawings and the following description thereof will serve to clarify the operation of the present improved multiple stage system, as well as point out additional advantageous features in connection therewith.

FIGURE 1 of the drawing is a schematic, cross sectional view, indicating a paint spray booth having accompanying filtering and treating zones providing for the recirculation of a substantially clean and purified air stream to the spray booth zone.

FIGURE 2 of the drawing indicates in a diagrammatic manner a method for effecting the alternating purification use and desorption cycle which may be provided for beds of adsorption particles employed to effect the removal to volatile components in the filtered air stream being recirculated to a paint spray booth.

Referring now particularly to FIGURE 1 of the drawing, there is indicated a spray booth zone 1 which is generally an elongated type of room designed to accommodate a continuous conveyor means, such as 2, for carrying material that is to be painted as it moves continuously through the zone. The present embodiment indicates auto bodies 3 being carried by the conveyor means 2 and such car bodies being subjected to enameling or lacquering from operators stationed in the spray booth. For simplicity, the drawing shows merely half of the spray booth zone and the accompanying treating stages in combination therewith. Actually the total unit may be considered as being symmetrical about a vertical center line extending through the middle of the auto body 3.

The floor of the spray booth 1 is provided with a continuous grill or grid means 4 which permits the down flow of a heating and/or ventilating air stream through the booth whereby entrained volatiles and particulates will be carried into a lower particulate removing zone 5 that is housing a continuously moving mesh type filter belt 6. The latter passes over a plurality of spaced crown rollers 7 within zone 5, a solvent removal zone 8 and a burn-off zone 9. The latter is equipped with a plurality of burners 10 being supplied by a fuel-air mixture from line 11 having control valve 12. Preferably, as indicated hereinbefore, the burners 10 are of the infra-red type suitable for providing controlled high energy heating to a confined relatively small area of the surface mesh type filter belt 6 within the burn-off zone 9. The impinging temperature should of course be adequate to effect the complete burn-off of the deposited material on the belt surface and permit the belt to be returned to the filtering or particulate removing zone 5 in a cleaned state. A brush means 13 may be positioned at the belt outlet section of the burn-off zone or at the solvent removal zone 8 such that oxidized ash-like particles will be completely removed from the openings in the mesh of belt 6 prior to its reuse for filtering the air stream descending through grid 4.

The temperature from the burner means 10 in zone 9 will of course provide some transfer of heat into the adjacent zone 8, which first receives the filter belt 6 from zone 5. Thus, there will be some heating and removal of the volatile components entrained with the deposited paint particulates in zone 8. At the same time, any condensaton of volatile solvent materials that may be collected in zone 8 can be removed from the floor by way of line 14 having control valve 15. However, as indicated hereinbefore, in a preferred operation, the burner means 10 shall be operated in a "rich" manner to minimize the presence of oxygen and to preclude any upstream burning of paint or other deposited particulates on the moving belt 6.

In the present embodiment, the gases from the burn-off zone 9 are passed by vent means 16 through an oxidizing catalyst zone 17 having a catalyst bed 18. The latter may comprise a permeable unit containing subdivided particles of an active oxidation catalyst or a mat-like unit of crimped alloy ribbon that is coated with a noble metal, and particularly a platinum group metal, whereby there will be oxidation and conversion of combustible materials in the gas stream to provide harmless, odorless, oxidation products which are primarily carbon dioxide and water. For example, one desirable form of catalytic fume incinerating means may comprise the all metal catalyst unit such as described within U.S. Patent No. 2,658,742 issued to H. R. Suter et al. The treated oxidized gas stream from catalyst oxidation zone 17 may be discharged into the atmosphere by way of duct 19 and stack 20 or in part recirculated and reused within the spray booth zone by passage through duct 21 and 22, fan means 23 and air distributing plenum 24 which in turn releases the gases downwardly through grill means 25 into the spray booth zone 1. Suitable valve means 26 and 27 can be adjusted to accommodate the desired gas flow through the recirculation fan and to the spray booth zone or to the atmosphere by way of stack 20.

The air stream from zone 5 is, in the present embodiment, shown to flow by way of passageway 28 into an adsorption section 29 which in turn accommodates two separate adsorption zones 30 and 31. The air flow to one or the other of the zones is controlled by a lower damper means 32 and an upper damper 33. As shown for one case, air flow with entrained volatile components carries by way of zone 30 into the transfer duct 22 after first passing through the adsorption bed 34. When the bed 34 becomes heavily saturated with volatile materials then it is subjected to desorption while air flow is routed (by means of the movement of damper means 32 and 33 into the dashed lined positions) such that adsorption is effected by bed 35 in zone 31.

As previously noted, the beds 34 and 35 for completing the purification of the air stream, may utilize activated carbon particles as the adsorption media since such material is particularly adapted to provide high adsorption activity for the volatile components being encountered from paint and lacquer spraying operations. During the desorption cycle, as indicated in the drawing for zone 31, there may be heated air provided by a bleed opening 36 in damper 32 and a burner means 37 for fuel being supplied by line 38 and control valve 39. A low velocity hot gas stream will thus pass through the bed 35 at a desorption temperature and at a rate sufficient to substantially and completely effect the removal of adsorbed volatiles. The desorption stream is carried by way of duct 40 and control valve 41 into duct 16 at a point upstream from the catalyst zone 17. Thus, the desorbed volatiles can be catalytically oxidized and removed from the air stream to permit discharge into the atmosphere or be recirculated into the air stream by way of duct 21 with control valve 27.

In the alternative operation, where the adsorption bed 34 is undergoing desorption, then the main air flow is through bed 35 and a desorbing heated air stream is passed upwardly through bed 34 by means of burner 42 which receives fuel by way of line 43 and control valve 44. The desorbed volatiles carry downstream from bed 34 through duct 45 which, although not shown on the drawing, may be made connective with duct 40 to in turn pass the volatiles into contact with the catalyst unit 18 in zone 17. During this cycle, the dampers 32 and 33 will be in the dash line positions and valve 46 at the inlet of duct 45 opened to accommodate the desorption stream and the entrained desorbed volatiles. Generally, the desorbing gas stream used during the reactivation cycle for each of the adsorption beds 34 and 35 will be at a temperature of the order of say 500° F. or more, so as to provide an effective removal of all of the adsorbed components. The streams passing by way of lines 40 and 45 into the oxidation zone 17 may generally be at a temperature sufficient to maintain catalytic oxidation within bed 18, particularly where the latter utilizes an active catalyst coating. However, where additional heat may be required to sustain complete incineration of the combustible entrained components, then a burner 47, being supplied fuel by line 48 and control valve 49, will assist in adding heat to the catalyst oxidation zone and insure complete conversion of the combustible materials as they pass through the bed.

In an operation where the oxidized gases leaving the zone 17 are maintained in the system, by recirculation through ducts 21 and 22 into fan 23, there may be provision for a continuous slip-stream removal of a portion of the combustion gases in order to preclude any build-up of carbon dioxide and, at the same time, provision to continuously introduce a small portion of fresh air into the system. Venting may be effected from above the plenum by duct 50 with adjustable valve 51 and fresh air introduced by duct 52 with adjustable valve 53 at a point connective with duct 22 just upstream from the fan 23.

In a normal operation, the air stream through the spray booth zone 1 will be maintained at a relatively constant temperature of say 75° F., or any other desired room temperature. The filtering and adsorption steps will have no effect on the air stream inasmuch as it is continuously circulating through only the moving filter belt 6 and the adsorption beds 34 and 35 which in turn will operate at room temperature in their respective contact zones. As indicated briefly hereinbefore, in an operation where there are substantially no obnoxious volatiles in the filtered stream, then it may be returned directly to the processing section. In other words, the absorption beds may be by-passed or eliminated from the system. The combustion products stream of oxidation zone 17 which can be passed by way of duct 21 into the recirculating air system will be at a high temperature of say 1,000° F. or more and thus be of advantage for some heating in cool seasons. During the summer months, such stream may be discharged to the atmosphere to prevent any heat build up in the system.

Referring now particularly to FIGURE 2 of the drawing, there is shown a schematic system utilizing a catalytic oxidizing unit to minimize heat input for the desorption heating stream, as well as flow arrangement means to retain the incinerated gas stream within the total system. In this modified type of operation, a filtered air stream with still entrained volatiles is shown as being carried by duct 55 into the branching duct means 56 and 57 by the operation of a movable upstream damper means 58 and a downstream damper means 59. An adsorption bed 60 which is provided to be in communication with duct 56 while a bed 61 is in communication with duct 57. The adsorption flow is, in this case, indicated by the black arrows carrying through duct 56 and bed 60 to outlet duct means 62 which in turn will channel the cleaned air back to spray booth means not shown. The desorbed volatile components and the oxidizing flow system is shown by the dashed arrows in the drawing, with desorption air flow being provided by duct means 63, with a control valve 64, that feeds into a central duct 65 that is connective with ducts 69 or 69' and 71 or 71' by virtue of the operation of movable damper means 66 and 67. Within duct 65 a hot gas stream from a catalyst unit 68 mixes with the air flow from duct 63 and passes by way of duct means 69 into passageway 70 and bed 61 in a desorbing flow direction. The desorbed volatiles are then carried by way of passageway 71 into fan 72 and then from the latter into the inlet end of oxidation zone 73 where they pass through an active oxidation catalyst unit 68 capable of substantially and completely converting the combustible components into carbon dioxide and water. The hot discharge stream at the outlet end of the combustion zone 73, after passage through catalyst unit 68, will in part recirculate through ducts 65, and 69 and 70 while a portion will be carried by way of duct 74, with control valve means 75, for reentry into the main air stream at duct 55. Burner means 76, receiving fuel by way of line 77 and control valve 78, will serve to initiate catalytic combustion in zone 73 and to maintain the desired temperature for the catalyst unit 68. However, provision is also made by means of duct 79, with control valve 80, to recirculate a part of the hot combustion gases by way of 72 directly back into the oxidation zone 73 whereby the desired temperature level may be maintained therein with a minimum of heat input from the burner 76.

The oxidizing catalyst unit 68 may comprise subdivided active catalyst particles, such as alumina impregnated with an active metal component, although again the present design may embody the use of an all metal type of catalyst unit, such as referred to hereinbefore as disclosed within the H. R. Suter et al. patent, No. 2,658,742.

The over-all flow control in the desorption portion of the system may be accomplished by adjustable valve means 81 which operates responsive to a temperature controller 82 that in turn connects by way of line 83 to a temperature sensitive element 84 into a downstream portion of oxidizing zone 73. Generally, the temperatures in the desorption loop will be controlled to effect complete desorption of the bed while at the same time maintaining a concentration of volatiles downstream from the absorption bed at about ten percent of the lower explosion limit of the stream.

For example, in a desorption operation the temperature increase across the catalyst unit 68, can vary from an inlet temperature of about 750° F. to a downstream temperature of about 1000° F. This high temperature stream upon mixing with the air stream being introduced by way of line 63 will provide a resulting temperature of about 500° F. for contact with the adsorption bed (for example bed 61). The 500° F. stream from the bed with entrained volatiles is then mixed with hot 1000° F. gases from duct 79 to in turn provide a mixed gas stream in the range of about 750° F. at the inlet to the catalyst unit 68. Thus, in this type of operation, the burner means 76 will have very little heat input to supply and fuel will be minimized in the system.

When the adsorption bed 60 is subjected to desorption, the aforedescribed system will be used in connection therewith, by the appropriate adjustment of dampers, 58, 59, 66, and 67, whereby the main air flow will pass by way of ducts 55, 57, 70 and 62. Also, the reverse flow desorbing air stream from 65 will pass by way of duct 69' to bed 60 and thence into duct 71' and to the upstream end of the catalytic oxidizing zone 73. Again, the rate of desorption through bed 60 will be controlled by the temperature rise across the catalyst unit 68 which in turn acts upon the temperature sensitive element 84 to operate the automatic control valve 81 which is connective with duct 65.

The adsorption beds 60 and 61 may be sized to provide adequate capacity for carrying out continuous adsorption of volatiles for a 15 to 30 minute cycle without undue saturation. The desorbing stream and the temperature conditions for the desorption cycle should, of course, be furnished to insure complete desorption within the period of time allotted for the cycle.

Still other physical and mechanical arrangements of contacting zones, duct work, valving means, etc. may be utilized in lieu of those which have been shown and be within the scope of the present invention. However, there shall be utilized at least one filtering belt means, a burn-off zone for the removal of deposited material on the belt means, and at least one adsorption bed and/or oxidizing catalytic bed means for elimination of contaminating components in the flow stream. For a paint spray booth system, it is desirable to utilize both the adsorption bed and the catalytic oxidation bed means to effect complete treatment of the separate stream flows. However, with other types of particulate removal and burning, merely one or the other of the fume or air treatment zones may be required in combination therewith. In still other cases, only the combined filtering and burn-off zones with the use of the wire mesh belt moving therethrough will be required to effect a desirable treating system.

I claim as my invention:

1. A continuous method for cleaning and purifying a processing zone discharge air stream containing combustible particulates, which comprises the steps of initially passing such stream from the processing zone through a moving heat resistant wire mesh filtering belt within a particulate removal zone discharging a resulting particle free stream from said removal zone, continuously passing a portion of said wire mesh filtering belt with deposited particles to a thermal burn-off zone and therein subjecting the belt to high temperature heating sufficient to effect the oxidation and removal of the deposited particles therefrom, continuously returning a cleaned portion of belt to said particulate removal zone while passing a resulting combustion gas stream from said burn-off zone to a catalytic oxidation zone and therein contacting a pervious oxidation catalyst bed to provide oxidation of entrained combustible constituents therein and a resulting unoffensive treated stream.

2. A continuous method for cleaning and purifying a processing zone discharge air stream containing combustible particulates, and obnoxious fumes, which comprises the steps of initially passing such stream from the processing zone through a moving heat resistant wire mesh filtering belt within a particulate removal zone, subsequently passing the resulting substantially particle free stream into a fume elimination zone and effecting the removal of any noxious volatile components remaining therein, recirculating at least a portion of the thusly cleaned air stream to said processing zone for reuse therein, continuously passing a portion of said wire mesh filtering belt with deposited particles to a thermal burn-off zone and therein subjecting the belt to high temperature heating sufficient to effect the oxidation and removal of the deposited particles therefrom, continuously returning a cleaned portion of belt to said particulate removal zone while passing a resulting combustion gas stream from said burn-off zone to a catalytic oxidation zone and therein contacting a pervious oxidation catalyst bed to provide oxidation of entrained combustible constituents therein and a resulting unoffensive treated stream.

3. The method of claim 2 further characterized in that said fume elimination zone contains a pervious oxidation catalyst bed, which bed may be in combination with said catalyst bed receiving the combustion gas stream from said burn-off zone.

4. A continuous method for cleaning and purifying a processing zone discharge air stream containing combustible particulates and obnoxious fumes, which comprises the steps of initially passing such stream from the processing zone through a moving heat resistant wire mesh filtering belt within a particulate removal zone, subsequently passing the resulting particle free stream into contact with an adsorption zone and therein removing noxious volatile components by passing the stream through a permeable bed of adsorption particles, recirculating at least a portion of the thusly cleaned air stream to said processing zone for reuse therein, continuously passing a portion of said wire mesh filtering belt with deposited particles to a thermal burn-off zone and therein subjecting the belt to high temperature heating sufficient to effect the oxidation and removal of the deposited particles therefrom, continuously returning a cleaned portion of belt to said particulate removal zone while passing a resulting combustion gas stream from said burn-off zone to a catalytic oxidation zone and therein contacting a pervious oxidation catalyst bed to provide oxidation of entrained combustible constituents therein and a resulting unoffensive treated stream.

5. The method of claim 4 further characterized in that said adsorption particles comprise activated carbon and, further, at least a portion of the resulting catalytically oxidized gases from said burn-off zone are returned to said processing zone with the air stream being used therein.

6. A continuous method for cleaning and purifying a processing zone discharge air stream containing particulates and noxious volatile components, which comprises the steps of initially passing such stream from said zone through a moving heat resistant wire mesh filtering belt within a particulate removal zone, subsequently passing the resulting particle free stream into an adsorption zone and therein removing noxious volatile components by passing the stream through a permeable bed of adsorption particles, recirculating at least a portion of the thusly cleaned air stream to said processing zone for reuse therein while continuously passing a portion of said wire mesh filtering belt with deposited particles to a thermal burn-off zone and therein subjecting the belt to high temperature heating sufficient to effect the oxidation and removal of said deposited particles therefrom, continuously returning a cleaned portion of said filter belt to said particulate removal zone while passing the resulting combustion gas stream and air from said burn-off zone to a catalytic oxidation zone and then prior to discharge contacting a pervious oxidation catalyst bed with such stream to provide oxidation of entrained combustible constituents therein.

7. A continuous method for cleaning and purifying a processing zone discharge air stream containing particulates and noxious volatile components, which comprises the steps of initially passing such stream from said zone through a moving heat resistant wire mesh filtering belt within a particulate removal zone, subsequently passing the resulting particle free stream into an adsorption zone and therein removing noxious volatile components by passing the stream through a permeable bed of adsorption particles, recirculating the thusly cleaned air stream to said processing zone for reuse therein while continuously passing a portion of said wire mesh filtering belt with deposited particles to a thermal burn-off zone and therein subjecting the belt to high temperature heating sufficient to effect the oxidation and removal of said deposited particles therefrom, continuously returning a cleaned portion of said filter belt to said particulate removal zone while passing the resulting combustion gas stream and air from said burn-off zone to a catalytic oxidation zone and therein contacting a pervious oxidation catalyst bed with such stream to provide oxidation of entrained combustible constituents therein, and then admixing at least a portion of this oxidized stream with said recirculating air stream leaving the adsorption zone.

8. The method of claim 7 further characterized in that at least two separate gas permeable adsorption beds are provided within said adsorption zone, with flow control means connective therewith permitting the alternating use of one bed for contacting said air stream to remove noxious volatile components while the other bed of the zone is contacted with a separate heated air stream introduced thereto to effect desorption of volatile components from such bed, and each bed is periodically subjected to the adsorption and desorption processing steps providing for continuous cleaning and purification of the discharge air stream in said system.

9. The method of claim 7 still further characterized in that the heated air stream with entrained volatile constitutents leaving an adsorption bed undergoing a desorption cycle is passed to said oxidizing catalyst zone whereby there is incineration of the entrained volatile constituents from said stream.

10. The method of claim 7 still further characterized in that in effecting the desorption of an adsorption bed in a desorption cycle, a slip-stream of filtered air with volatiles entrained therein is admixed with a hot oxidized gaseous stream obtained as hereinafter set forth, and the resulting heated stream is passed in a reverse desorption flow through said bed being desorbed and then introduced into contact with a permeable oxidizing catalyst bed at oxidizing conditions providing for the substantially complete incineration of entrained volatile constituents, passing at least a portion of the resulting treated and oxidized gas stream to said recirculation air stream passing into contact with the other of the adsorption beds for removal of the volatile constituents therein, while at the same time, introducing at least a portion of the resulting hot oxidized gas stream into admixture with said slip-stream of filtered air as afordescribed, and effecting the regulation of the quantity of hot gaseous stream being admixed with said slip-stream by control means acting responsive to variations in the temperature of the gaseous stream leaving said oxidizing catalyst bed.

11. The method of claim 1 further characterized in that said moving heat resistant filtering belt is subjected to the impingment of high temperature infra-red heating within said burnoff zone under conditions effecting the complete removal of deposited particulates from said belt.

12. The method of claim 11 still further characterized in that the infra-red heating provided in said burn-off zone comprises infra-red heat generation from the catalytic oxidation of a rich fuel-air stream being supplied to a catalytically coated alloy metal mesh screen surface for such heat supplying means, whereby there is high temperature substantially flameless infra-red heat generation from such screen means and, further, the rich fuel mixture thereto provides minimal oxygen present in the combustion gases therefrom to preclude particulates burning away from the infra-red impingment area.

13. A continuous method for cleaning and purifying a paint spray booth discharge air stream containing particulates and noxious volatile components, which comprises the steps of initially passing such stream downwardly from the lower portion of the spray booth through a moving heat resistant wire mesh filtering belt within a particulate removal zone, subsequently passing the resulting particle free stream into an adsorption zone and therein removing noxious volatile components by passing the stream through a permeable bed of subdivided adsorption particles, recirculating the thusly cleaned air stream to the upper portion of said spray booth for reuse therein while continuously passing a portion of said wire mesh filtering belt with deposited paint particles to a thermal burn-off zone and therein subjecting the belt to high temperature infra-red heating sufficient to effect the oxidation and removal of said deposited particles therefrom, continuously returning a cleaned portion of said filter belt to said particulate removal zone while passing the resulting combustion gas stream and air from said burn-off zone to a catalytic oxidation zone and therein contacting a pervious all metal oxidation catalyst unit with such stream to provide oxidation of entrained combustible constituents therein, and then admixing at least a portion of this oxidized stream with said recirculating air stream leaving the adsorption zone whereby to retain heated and purified streams in the spray booth system.

References Cited

UNITED STATES PATENTS

| | | | |
|---|---|---|---|
| 2,658,742 | 11/1953 | Suter et al. | 23—288 X |
| 2,743,529 | 5/1956 | Hayes | 23—288 X |
| 2,750,680 | 6/1956 | Houdry et al. | 23—288 X |

OSCAR R. VERTIZ, *Primary Examiner.*

E. THOMAS, *Assistant Examiner.*